United States Patent
Shigeeda et al.

(10) Patent No.: US 8,743,873 B2
(45) Date of Patent: Jun. 3, 2014

(54) TRAIN COMMUNICATION SYSTEM AND TRAIN COMMUNICATION METHOD

(75) Inventors: Tetsuya Shigeeda, Chiyoda-ku (JP); Hiroyuki Ohata, Chiyoda-ku (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 169 days.

(21) Appl. No.: 13/146,579

(22) PCT Filed: Jan. 20, 2010

(86) PCT No.: PCT/JP2010/050633
§ 371 (c)(1),
(2), (4) Date: Jul. 27, 2011

(87) PCT Pub. No.: WO2010/087258
PCT Pub. Date: Aug. 5, 2010

(65) Prior Publication Data
US 2011/0286464 A1    Nov. 24, 2011

(30) Foreign Application Priority Data
Jan. 27, 2009   (JP) .................................. 2009 015877

(51) Int. Cl.
*H04L 12/28* (2006.01)

(52) U.S. Cl.
USPC ............ 370/389; 370/400; 370/532; 370/533

(58) Field of Classification Search
USPC ................................................ 370/532, 533
See application file for complete search history.

(56) References Cited

U.S. PATENT DOCUMENTS

| | | | | |
|---|---|---|---|---|
| 6,493,767 | B1 * | 12/2002 | Ishida et al. | 709/249 |
| 6,724,740 | B1 * | 4/2004 | Choi et al. | 370/335 |
| 6,867,708 | B2 * | 3/2005 | Darby et al. | 340/933 |
| 6,982,953 | B1 * | 1/2006 | Swales | 370/218 |
| 7,058,410 | B2 * | 6/2006 | Hiyama et al. | 455/456.1 |
| 7,206,299 | B2 * | 4/2007 | Matsugatani et al. | 370/331 |

(Continued)

FOREIGN PATENT DOCUMENTS

| | | |
|---|---|---|
| JP | 2003-060670 A | 2/2003 |
| JP | 2004-201476 A | 7/2004 |

(Continued)

OTHER PUBLICATIONS

Comer, "Internetworking with TCP/IP: Principles, Protocols, and Architecture," vol. 1, 4th Ed. pp. 76-80, Kyoritsu Shuppan, with corresponding English version (Japanese version has been submitted on Jul. 27, 2011).

(Continued)

*Primary Examiner* — Ian N Moore
*Assistant Examiner* — Lakeram Jangbahadur
(74) *Attorney, Agent, or Firm* — Buchanan Ingersoll & Rooney PC

(57) ABSTRACT

A train communication system includes a communication relay device that is installed in each vehicle and a communication terminal device that is connected to the communication relay device. The communication relay device acquires vehicle information indicating an in-formation position of a vehicle in which the communication relay device is installed. The communication terminal device refers to a correspondence table that defines a correspondence relationship between vehicle information and communication identification information, and determines communication identification information to be provided to the communication terminal device, based on vehicle information obtained from the communication relay device.

33 Claims, 7 Drawing Sheets

(56) References Cited

U.S. PATENT DOCUMENTS

| | | | |
|---|---|---|---|
| 7,466,992 B1* | 12/2008 | Fujisaki | 455/556.1 |
| 7,519,356 B2* | 4/2009 | Miyake et al. | 455/415 |
| 7,609,687 B2* | 10/2009 | Kobayashi et al. | 370/356 |
| 7,762,672 B2* | 7/2010 | Yokoyama et al. | 353/42 |
| 7,889,691 B2* | 2/2011 | Chen et al. | 370/315 |
| 7,991,856 B2* | 8/2011 | Takizawa et al. | 709/220 |
| 8,204,034 B2* | 6/2012 | Ahuja et al. | 370/349 |
| 8,245,983 B2* | 8/2012 | Gilbertson | 246/167 R |
| 8,254,289 B2* | 8/2012 | Tatsumi et al. | 370/254 |
| 8,289,558 B2* | 10/2012 | Katano | 358/1.15 |
| 8,488,617 B2* | 7/2013 | Takeyama et al. | 370/400 |
| 2003/0144018 A1* | 7/2003 | Minnick et al. | 455/519 |
| 2006/0153189 A1* | 7/2006 | Nitou | 370/389 |
| 2006/0187956 A1* | 8/2006 | Doviak et al. | 370/466 |
| 2007/0109998 A1* | 5/2007 | Hara et al. | 370/331 |
| 2007/0208864 A1* | 9/2007 | Flynn et al. | 709/227 |
| 2009/0025079 A1* | 1/2009 | Tanizawa et al. | 726/14 |
| 2009/0238350 A1* | 9/2009 | Esaka et al. | 379/93.02 |
| 2010/0017122 A1* | 1/2010 | Chang | 701/210 |
| 2010/0046436 A1* | 2/2010 | Doviak et al. | 370/328 |
| 2010/0098095 A1* | 4/2010 | Kato et al. | 370/401 |
| 2010/0303070 A1* | 12/2010 | Shigeeda et al. | 370/389 |
| 2011/0286464 A1* | 11/2011 | Shigeeda et al. | 370/400 |

FOREIGN PATENT DOCUMENTS

| | | | |
|---|---|---|---|
| JP | 2004201476 | * | 7/2004 |
| JP | 2004-312807 A | | 11/2004 |
| JP | 2005-175904 A | | 6/2005 |
| JP | 2008-172461 A | | 7/2008 |

OTHER PUBLICATIONS

Comer, "Internetworking with TCP/IP: Principles, Protocols, and Architecture," vol. 1, 4th Ed. pp. 377-381, Kyoritsu Shuppan, with corresponding English version.

International Search Report (PCT/ISA/210) for PCT/JP2010/050633 dated Feb. 16, 2010.

Written Opinion (PCT/ISA/237) for PCT/JP2010/050633 dated Feb. 16, 2010.

D. Comer, Internetworking with TCP/IP, vol. I, 4th Edition, Aug. 2008, Kyoritsu Shuppan (4 pages in Japanese).

* cited by examiner

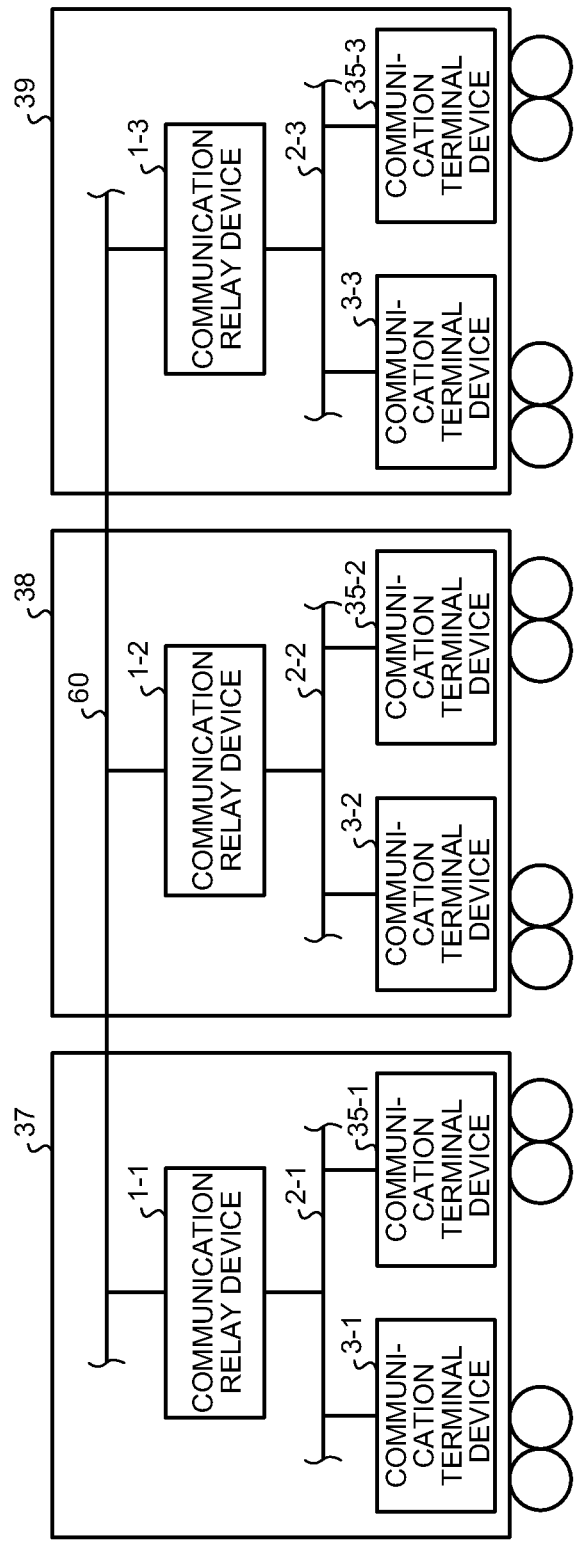

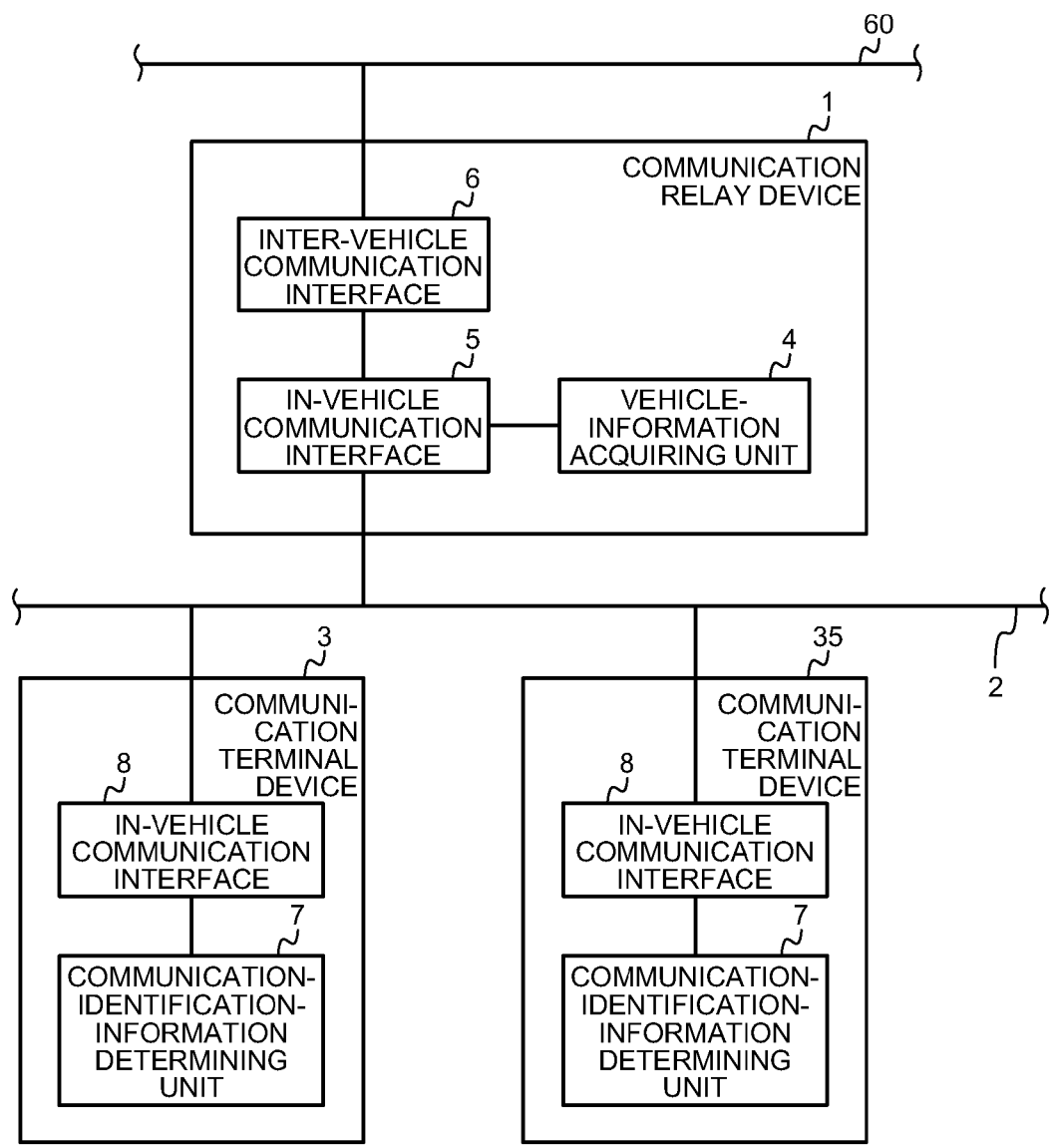

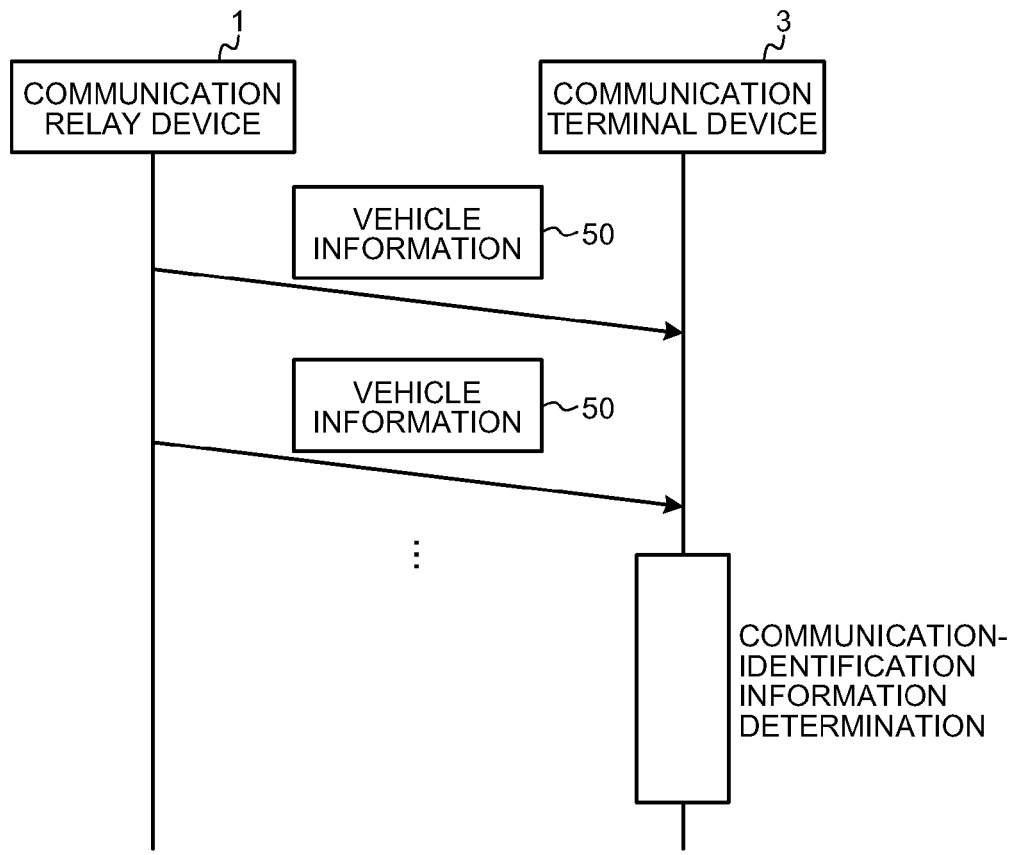

| VEHICLE INFORMATION (CAR NUMBER) | POSITION NUMBER | COMMUNICATION IDENTIFICATION INFORMATION |
|---|---|---|
| N | 1 | 192.168.N.1 |
| | 2 | 192.168.N.2 |
| | 3 | 192.168.N.3 |
| | 4 | 192.168.N.4 |
| | 5 | 192.168.N.5 |

TRAIN COMMUNICATION SYSTEM AND TRAIN COMMUNICATION METHOD

FIELD

The present invention relates to a train communication system that is configured by a formation of one or more vehicles and a train communication method for the system.

BACKGROUND

TCP/IP has been well known as a communication protocol between devices. In TCP/IP, an IP address is used as information for identifying a device when communications between devices are performed. When TCP/IP is used, an IP address that is uniquely determined needs to be allocated to each device on a network.

As a method for determining an IP address of each device on a network, there is a method of providing an IP address to each device while avoiding duplication, recording the IP address in a recording device in each device, and using the recorded IP address at the time of starting the device.

Furthermore, as a method for determining an IP address of each device on a network, there is also a method of a RARP (Reverse Address Resolution Protocol) (see, for example, Non Patent Literature 1). In the RARP, each device broadcast-transmits a RARP message to a network at a starting time. A RARP server on the network distributes an IP address to a transmission source device via the network in response to the RARP message.

Further, as IP-address distribution methods alternative to the RARP, there are BOOTP, DHCP or the like. Each of these mechanisms determines an IP address by distributing an IP address to a device.

CITATION LIST

Non Patent Literature

Non Patent Literature 1: Douglas E. Corner, 'Internetworking with TCP/IP', Vol. 1, 4th Edition, August 2008, KYORITSU SHUPPAN

SUMMARY

Technical Problem

As a communication protocol between devices that is set in a formation of a train, a case of using TCP/IP is considered, for example. Because a train is operated in a unit of a formation, IP addresses of devices that are installed in a formation need to be set at mutually different values. Particularly, considering that trains are managed and maintained in a unit of formation, it is considered preferable that mutually different IP addresses are provided to devices of a same model between vehicles in a formation and a same IP address is provided to devices of the same model when the devices are installed at the same positions in a formation between formations. In addition, provision of the IP addresses does not need to be individually and manually performed to all devices each time when a formation is configured, and preferably, IP addresses are automatically set without duplication at a system starting time.

The present invention has been achieved in view of the above problems, and an object of the present invention is to provide a train communication system that can provide mutually different IP addresses to devices of a same model between vehicles in a formation and can provide a same IP address to devices of the same model when the devices are installed at same positions in a formation between formations and automatically sets IP addresses, and to provide a train communication method.

Solution to Problem

In order to solve the above problem and in order to attain the above object, in a train communication system that is configured in a formation of a train constituted by one or more vehicles, the system of the present invention includes: a communication relay device that is installed in each of the vehicles and is connected to an inter-vehicle communication path and an in-vehicle communication path; and one or more communication terminal devices that are installed in each of the vehicles and are connected to the communication relay device in a same vehicle by the in-vehicle communication path. The communication relay device includes a vehicle-information acquiring unit that acquires vehicle information indicating an in-formation position of a vehicle in which the communication relay device is installed and transmits the acquired vehicle information to the in-vehicle communication path. Each of the communication terminal devices includes a communication-identification-information determining unit that includes a correspondence table that is set without duplication for each model of the communication terminal device and provides communication identification information to be used corresponding to at least the vehicle information, and determines the communication identification information to be provided to the communication terminal device at least based on the vehicle information having received from the in-vehicle communication path and the correspondence table.

Additionally, in a train communication method of a train communication system that is configured in a formation of a train constituted by one or more vehicles, and that includes a communication relay device that is installed in each of the vehicles and is connected to an inter-vehicle communication path and an in-vehicle communication path, and one or more communication terminal devices that are installed in each of the vehicles and are connected to the communication relay device in a same vehicle by the in-vehicle communication path, the method of the present invention, includes: a step of acquiring, by the communication relay device, vehicle information indicating an in-formation position of a vehicle in which the vehicle itself is installed; a step of transmitting, by the communication relay device, the acquired vehicle information to the in-vehicle communication path; a step of receiving, by the communication terminal device, the vehicle information from the in-vehicle communication path; and a step of determining, by each of the communication terminal devices, the communication identification information to be provided to the communication terminal device at least based on a correspondence table that is set without duplication for each model of the communication terminal device and provides communication identification information to be used corresponding to at least the vehicle information, and the vehicle information having received.

More additionally, in a train communication method of a train communication system that is configured in a formation of a train constituted by one or more vehicles, and that includes a communication relay device that is installed in each of the vehicles and is connected to an inter-vehicle communication path and an in-vehicle communication path, and one or more communication terminal devices that are installed in each of the vehicles and are connected to the communication relay device in a same vehicle by the in-vehicle communication path, the method of the present invention includes: a step of transmitting to the in-vehicle communication path, by each of the communication terminal devices, a communication-identification-information request signal for requesting a transmission of communication identification information to the communication relay device; a step of receiving, by the communication relay device, the communication-identification-information request signal from the in-vehicle communication path; a step of determining, by the communication relay device, the communication identification information to be provided to each of the communication terminal devices, based on at least a correspondence table that is set without duplication for each model of the communication terminal device and provides communication identification information to be used corresponding to at least vehicle information, and the vehicle information, by obtaining the vehicle information indicating an in-formation position of a vehicle in which the device itself is installed; a step of transmitting, by the communication relay device, the determined communication identification information to the in-vehicle communication path; and a step of receiving, by the communication terminal device, the communication identification information from the in-vehicle communication path.

Advantageous Effects of Invention

According to the present invention, communication identification information to be provided to a communication terminal device is determined based on at least vehicle information and a correspondence table that is set without duplication for each model. Therefore, mutually different pieces of communication identification information can be provided to communication terminal devices of a same model between vehicles in a formation, and the same communication identification information can be provided to devices of the same model when the devices are installed at the same positions in a formation that are specified by the same vehicle information between formations. Furthermore, because the communication terminal devices obtain communication identification information corresponding to vehicle information by themselves, setting of the communication identification information is performed automatically.

BRIEF DESCRIPTION OF DRAWINGS

FIG. 1 is a configuration diagram of a train communication system according to a first embodiment.

FIG. 2 is a block diagram of an internal configuration of a communication relay device and communication terminal devices according to the first embodiment.

FIG. 3 depicts a sequence for a communication terminal device to determine communication identification information in the train communication system according to the first embodiment.

FIG. 4 is an example of a correspondence table of a relationship between vehicle information and communication identification information, the correspondence table being held by a communication-identification-information determining unit in the first embodiment.

DESCRIPTION OF EMBODIMENTS

Figure 5:
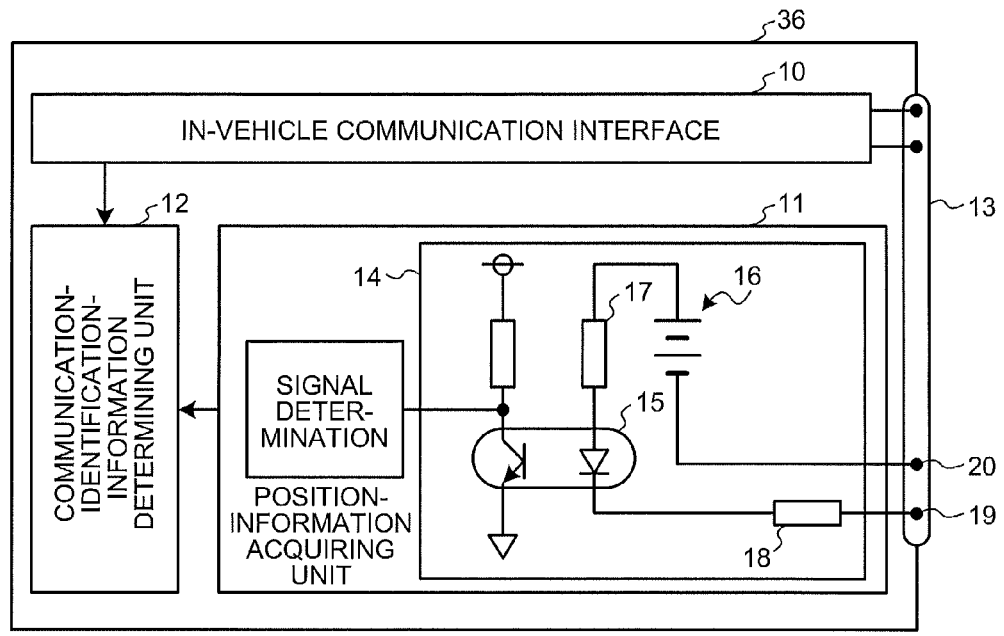
FIG. 5 is a configuration diagram of a communication terminal device according to a second embodiment.

Exemplary embodiments of a train communication system and a train communication method according to the present invention will be explained below in detail with reference to the accompanying drawings. The present invention is not limited to the embodiments.

First Embodiment

FIG. 1 is a configuration diagram of a train communication system according to a first embodiment of the present invention. FIG. 1 depicts a communication system that is configured in a formation of three vehicles 37, 38, and 39, for example. A communication relay device 1-1 that is mounted on the vehicle 37, a communication relay device 1-2 that is mounted on the vehicle 38, and a communication relay device 1-3 that is mounted on the vehicle 39 are connected to each other such that these vehicles can communicate with each other via an inter-vehicle communication path 60 provided between the vehicles. The vehicles 37 to 39 correspond to first to third cars, respectively, for example. In the vehicle 37, two communication terminal devices 3-1 and 35-1 are installed, for example, and these communication terminal devices are communicably connected to the communication relay device 1-1, respectively via an in-vehicle communication path 2-1. Similarly, in the vehicle 38, two communication terminal devices 3-2 and 35-2 are installed, for example, and these communication terminal devices are communicably connected to the communication relay device 1-2, respectively via an in-vehicle communication path 2-2. Similarly, in the vehicle 39, two communication terminal devices 3-3 and 35-3 are installed, for example, and these communication terminal devices are communicably connected to the communication relay device 1-3, respectively via an in-vehicle communication path 2-3. The number of vehicles that constitute a formation and the number of communication terminal devices that are installed in each of the vehicles can be arbitrary.

FIG. 2 is a block diagram of an internal configuration of a communication relay device and communication terminal devices according to the present embodiment. In FIG. 2, a communication relay device 1 collectively represents the communication relay devices 1-1, 1-2, and 1-3 in FIG. 1. Therefore, communication terminal devices 3 and 35 that are connected to the communication relay device 1 represent two communication terminal devices that are connected to any of the communication relay devices 1-1, 1-2, and 1-3.

As shown in FIG. 2, the communication relay device 1 includes a vehicle-information acquiring unit 4, an in-vehicle communication interface 5, and an inter-vehicle communication interface 6. The vehicle-information acquiring unit 4 acquires vehicle information (car number, for example) indicating an in-formation position of a vehicle in which the communication relay device 1 is installed. For the vehicle-information acquiring unit 4, there is a unit that uses a method of acquiring vehicle information by inputting a car number at a contact by using a contact information interface (not shown) provided in the communication relay device 1 (refer to a second embodiment for an example of the contact information interface), for example. For the vehicle-information acquiring unit 4, there is also a unit that uses a method of acquiring vehicle information by transmission by communicating with a vehicle managing device (not shown), for example.

The inter-vehicle communication interface 6 is a communication interface for transmitting/receiving inter-vehicle data that is connected to the inter-vehicle communication path 60. For example, the communication relay device 1-1 of the vehicle 37 can perform inter-vehicle communications with the communication relay device 1-2 of the vehicle 38 via the inter-vehicle communication path 60 by using the inter-vehicle communication interface 6 of the vehicle 37. The in-vehicle communication interface 5 is a communication interface for in-vehicle communications that is connected to an in-vehicle communication path 2. The in-vehicle communication interface 5 is connected to the vehicle-information acquiring unit 4 and the inter-vehicle communication interface 6, respectively.

The communication terminal device 3 represents various kinds of devices (such as a brake and an air conditioner) that include a communication function, and includes a communication-identification-information determining unit 7 and an in-vehicle communication interface 8 as the communication function. The communication-identification-information determining unit 7 determines communication identification information to be used by the communication terminal device 3, based on vehicle information transmitted from the communication relay device 1. The communication identification information is identification information at a communication time that is uniquely allocated by the communication terminal device 3 in a formation, such as an IP address, for example. The in-vehicle communication interface 8 is a communication interface for in-vehicle communications that is connected to the in-vehicle communication path 2. The in-vehicle communication interface 8 is also connected to the communication-identification-information determining unit 7. Above descriptions are similarly applied to the communication terminal device 35.

Communications between communication terminal devices of an own car are performed by using the in-vehicle communication path 2. That is, communications between the communication terminal device 3 and the communication terminal device 35 are performed by using the in-vehicle communication path 2. Communications between communication terminal devices between cars are performed via the in-vehicle communication path, the inter-vehicle communication path, and the communication relay device. For example, the communication terminal device 3-1 of the vehicle 37 can communicate with the communication terminal device 3-2 of the vehicle 38 via the in-vehicle communication path 2-1, the communication relay device 1-1, the inter-vehicle communication path 60, the communication relay device 1-2, and the in-vehicle communication path 2-2. Communication identification information is identification information for uniquely specifying the communication terminal device 3 in a formation. In the case of communicating from the communication terminal device 3 to other device, communication identification information of the communication terminal device 3 is used as communication-source identification information. In the case of communicating from the other device to the communication terminal device 3, communication identification information of the communication terminal device 3 is used as communication-destination identification information.

FIG. 3 depicts a sequence for the communication terminal device 3 to determine communication identification information in the communication system. In FIG. 3, the communication relay device 1 periodically transmits vehicle information 50 acquired by the vehicle-information acquiring unit 4 to the in-vehicle communication path 2. The vehicle information 50 specifies a position in a formation of a vehicle on which the communication relay device 1 is mounted, and corresponds to a car number, for example. When the communication relay device 1 transmits the vehicle information 50 to the in-vehicle communication path 2, the vehicle information 50 is transmitted such that all the communication terminal devices 3 and 35 that are connected to the in-vehicle communication path 2 can receive this information. Upon receiving the vehicle information 50, the communication terminal device 3 determines communication identification information to be provided to the communication terminal device 3 based on at least the vehicle information 50 and a correspondence table described later, by using the communication-identification-information determining unit 7. Although only the communication terminal device 3 is shown in an example shown in FIG. 3, above descriptions are similarly applied to the communication terminal device 35.

FIG. 4 is an example of a correspondence table of a relationship between vehicle information and communication identification information, the correspondence table being held by the communication-identification-information determining unit 7. The correspondence table is set with a content of a communication terminal device without duplication corresponding to a model of the device. In this correspondence table, a car number is used for vehicle information, and an IP address is used for communication identification information, for example. In the communication terminal device 3, the communication-identification-information determining unit 7 includes the correspondence table of FIG. 4, for example. When the communication terminal device 3 receives the vehicle information 50 from the communication relay device 1, the communication terminal device 3 determines communication identification to be provided to the device itself, by using this correspondence table.

Details of the above configuration are explained below. When the communication terminal device 3 is installed in the first car, for example, the communication terminal device 3 receives a car number "1" for vehicle information from the communication relay device 1 of the first car. The communication-identification-information determining unit 7 determines "192.168.1.1" for communication identification information from the received car number "1" and the correspondence table. This is similarly applied to a case where the communication terminal device 3 is installed in the second car, and communication identification information is determined as "192.168.2.1" in this case. As shown in FIG. 4, in the correspondence table held by the communication-identification-information determining unit 7, vehicle information (car number) is used in a third octet of the communication identification information.

Communication identification information of the communication terminal device 35 can be also similarly determined. Assume that the communication terminal device 35 is a different model from that of the communication terminal device 3. In this case, the communication-identification-information determining unit 7 of the communication terminal device 35 includes a correspondence table that is different from the table in FIG. 4. Taking an example, communication identification information "192.168.1.2" is provided to "vehicle information (car number) 1", communication identification information "192.168.2.2" is provided to "vehicle information (car number) 2", communication identification information "192.168.3.2" is provided to "vehicle information (car number) 3", and so on. In this manner, to distinguish communication identification information from that of the communication terminal device 3 in the same vehicle, a fourth octet of the communication identification information to be provided to the communication terminal device 35 is set at a different value from that of the communication terminal device 3, such as "2".

In the train communication system according to the present embodiment, the communication terminal device receives vehicle information from the communication relay device. The train communication system determines communication identification information of the system itself based on this vehicle information and the correspondence table that is set without duplication for each model, and starts communicating. Therefore, according to the present embodiment, to communication terminal devices of the same model, mutually different pieces of communication identification information can be provided between vehicles, in a formation. The same communication identification information can be provided to communication terminal devices of the same model that are installed at the same in-formation positions that are specified by the same vehicle information, between formations. Further, because the communication terminal devices autonomously obtain communication identification information, setting of the communication identification information is automatically performed at a system starting time.

In the present embodiment, different IP addresses are not provided to a communication terminal device each time when the communication system is started, unlike the case of using DHCP and the like. Therefore, the present embodiment is suitable for a train communication system in which IP addresses can be maintained and managed in a unit of a formation and a wiring path is generally fixed.

Second Embodiment

FIG. 5 is a configuration diagram of a communication terminal device according to a second embodiment of the present invention. In FIG. 5, a communication terminal device 36 includes an in-vehicle communication interface 10, a position-information acquiring unit 11 as an in-vehicle position determining unit, a communication-identification-information determining unit 12, and a cable connector 13. The communication terminal device 36 is connected to the communication relay device 1 via the in-vehicle communication path 2, in a similar manner to that of a case in FIG. 2.

The position-information acquiring unit 11 acquires installation position information in a vehicle of the communication terminal device 36. This function is suitably used to distinguish between installation positions of communication terminal devices of the same model by specifying these installation positions when a plurality of communication terminal devices are installed in the same vehicle.

As an example of the position-information acquiring unit 11, a contact-information acquiring unit 14 is provided in FIG. 5. The contact-information acquiring unit 14 acquires contact information corresponding to presence of a short-circuiting between pins 19 and 20 in the cable connector 13 that is connected to the in-vehicle communication path 2.

Specifically, the contact-information acquiring unit 14 is configured to include a photo-coupler 15, a photo-coupler power source 16, a current-limiting resistor 17, and a protection resistor 18. An output terminal of the protection resistor 18 is connected to the pin 19 in the cable connector 13, and the pin 20 in the cable connector 13 is connected to a cathode of the photo-coupler power source 16. The contact-information acquiring unit 14 detects presence of a connection between the pins 19 and 20. The position-information acquiring unit 11 determines a signal of a detection result, and outputs the detection result to the communication-identification-information determining unit 12. A value of the output of the position-information acquiring unit 11 is used for a position number of a device concerned, for example.

For example, when it is assumed that when the communication terminal device 36 is installed at a position of a position number "1" in a vehicle, a connector (not shown) connects the pins 19 and 20, and that when the communication terminal device 36 is installed at a position of a position number "2" in a vehicle, the pins 19 and 20 are not connected to each other. In the former case, the photo-coupler 15, the photo-coupler power source 16, the current-limiting resistor 17, and the protection resistor 18 become a closed circuit, and a signal is output from the contact-information acquiring unit 14. In the latter case, no signal is output from the contact-information acquiring unit 14. Therefore, the position-information acquiring unit 11 can distinguish between the both, can output a signal corresponding to the position number "1" to the communication-identification-information determining unit 12 in the former case, and can output a signal corresponding to the position number "2" to the communication-identification-information determining unit 12 in the latter case. As is clear from the above descriptions, in the example of FIG. 5, only positions of two communication terminal devices can be distinguished.

Figure 6:
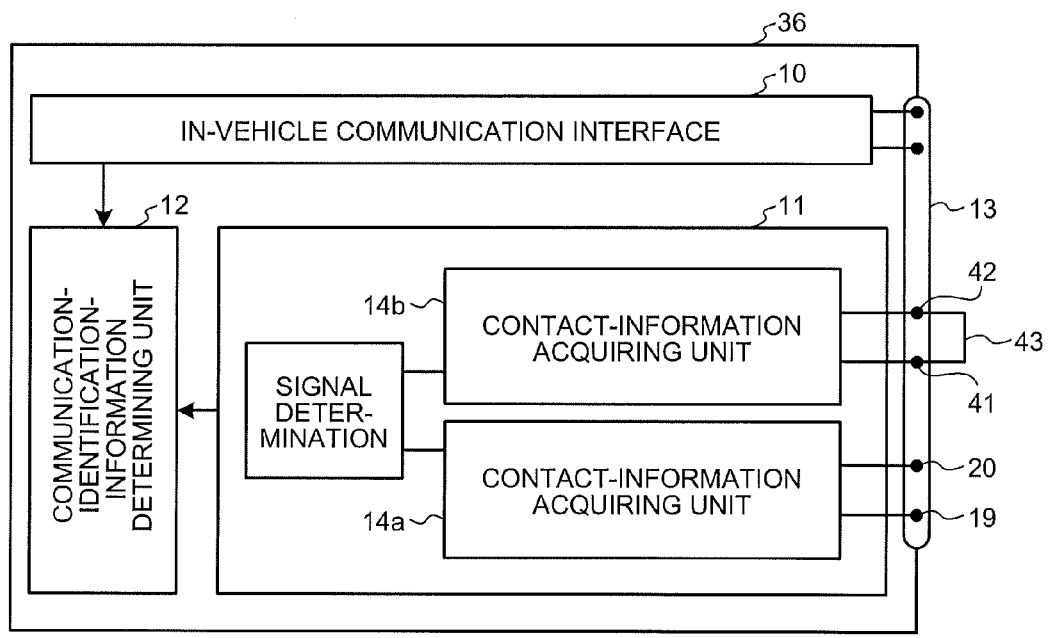
FIG. 6 is another configuration diagram of the communication terminal device according to the second embodiment.

In the case of assigning positions of three or more communication terminal devices, similar circuits are prepared in plural to assign these positions. FIG. 6 is another configuration diagram of the communication terminal device according to the second embodiment. As shown in FIG. 6, two contact-information acquiring units 14a and 14b are provided, for example, in the position-information acquiring unit 11. A circuit configuration of each of the contact-information acquiring units 14a and 14b is the same as that of the contact-information acquiring unit 14 in FIG. 5. The contact-information acquiring unit 14a is connected to the pins 19 and 20, and the contact-information acquiring unit 14b is connected to pins 41 and 42. In this configuration, four position numbers can be identified in total based on combinations of presence of a connection between the pins 19 and 20 and presence of a connection between the pins 41 and 42. In the example shown in FIG. 6, the pins 41 and 42 are connected to each other by a connector 43. In the case of assigning four or more communication terminal devices, the communication terminal devices can be configured by increasing the number of contact-information acquiring units in a similar manner.

As explained above, the position-information acquiring unit 11 determines an in-vehicle position of the communication terminal device 36 based on contact information (combination information of presence of a short-circuiting between pairs of pins) incorporated in the cable connector 13 as a communication connector. The unit that acquires contact information is not limited to the example described above, and an in-vehicle position can be also determined based on contact information incorporated in a power source connector (not shown) of the communication terminal device 36, by using this power source connector, for example.

Figures 7, 8:
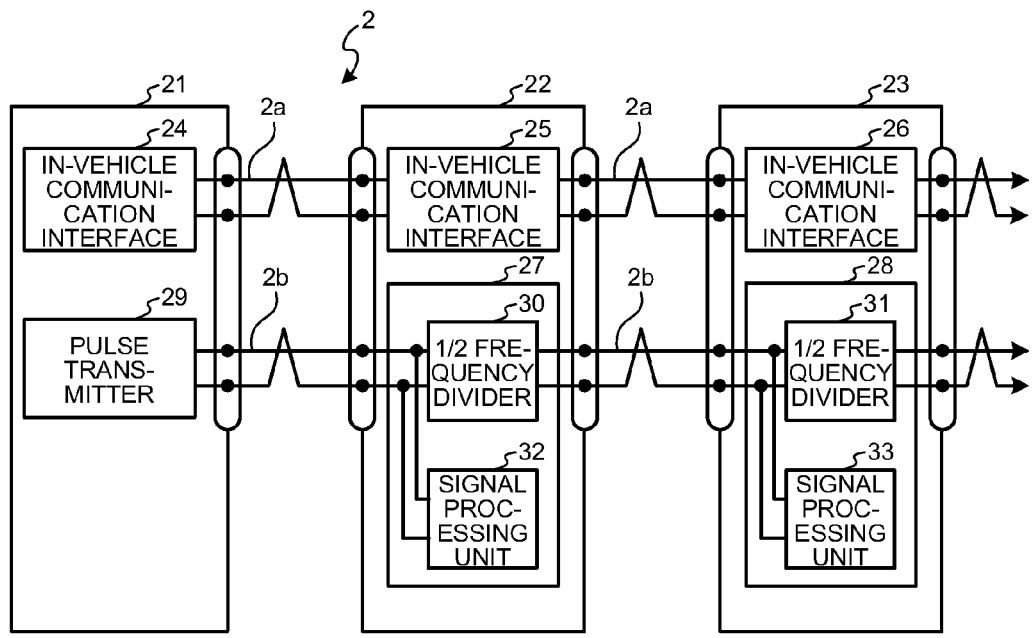
FIG. 7 is an example of a correspondence table of a relationship between a combination of vehicle information and in-vehicle position information and communication identification information, the correspondence table being used by a communication-identification-information determining unit in the second embodiment.
FIG. 8 is a partial configuration diagram of a train communication system according to a third embodiment.

FIG. 7 is an example of a correspondence table of a relationship between a combination of vehicle information and in-vehicle position information and communication identification information, the correspondence table being used by the communication-identification-information determining unit 12. In this correspondence table, a car number is used for vehicle information and a position number is used for in-vehicle position information. An IP address is used for communication identification information. In the example shown in FIG. 7, a value of a car number is used for a third octet of an IP address, and a position number is used for a fourth octet. Fixed values are used for first and second octets.

When the communication terminal device 36 receives vehicle information via the in-vehicle communication interface 10, the communication-identification-information determining unit 12 determines communication identification information of the device by using this vehicle information, a position number obtained from the position-information acquiring unit 11, and this correspondence table. When five communication terminal devices of the same model are installed in the same vehicle, for example, each communication terminal device can hold the correspondence table of FIG. 7 for example, and can obtain an IP address that is different from each other corresponding to an acquired position number. When three different communication terminal devices are further installed in the same vehicle, these three communication terminal devices hold correspondence tables of contents that are different from those in FIG. 7. For example, these three communication terminal devices respectively hold correspondence tables in which pieces of communication identification information "192.168.N.6" to "192.168.N.8" are related to vehicle information (car number) and a position number.

According to the present embodiment, the communication terminal device 36 can receive vehicle information from the communication relay device, obtain a position number from the position-information acquiring unit 11, and determine communication identification information of the device itself based on the correspondence table of vehicle information and a position number. Therefore, even when a plurality of communication terminal devices of the same model are installed in the same vehicle, mutually different pieces of communication identification information can be provided to these devices by providing the same correspondence table without providing mutually different correspondence tables to these devices in advance. Other configurations, operations, and effects of the present embodiment are identical to those of the first embodiment.

Third Embodiment

FIG. 8 is a partial configuration diagram of a train communication system according to a third embodiment of the present invention. In FIG. 8, two or more communication terminal devices such as a communication terminal device 22 and a communication terminal device 23, for example, are connected in series to a communication relay device 21 in the same vehicle.

The communication relay device 21 includes an in-vehicle communication interface 24 and a pulse transmitter 29 as a position-determination-signal generating unit, and, although these are not shown, also includes an inter-vehicle communication interface and a vehicle-information acquiring unit in a similar manner to that of the case in FIG. 2. The communication terminal device 22 includes an in-vehicle communication interface 25 and a position-information acquiring unit 27, and, although it is not shown, also includes a communication-identification-information determining unit in a similar manner to that of the case in FIG. 5. Similarly, the communication terminal device 23 includes an in-vehicle communication interface 26 and a position-information acquiring unit 28, and, although it is not shown, also includes a communication-identification-information determining unit in a similar manner to that of the case in FIG. 5. The communication relay device 21, the communication terminal device 22, and the communication terminal device 23 are connected to each other in this order via the in-vehicle communication path 2. The position-information acquiring unit 27 includes a 1/2 frequency divider 30 and a signal processing unit 32. Similarly, the position-information acquiring unit 28 includes a 1/2 frequency divider 31 and a signal processing unit 33.

The communication relay device 21 includes the pulse transmitter 29 of a frequency f(Hz), and transmits the signal to the communication terminal device 22 as a position determination signal. While the signal is transmitted via the in-vehicle communication path 2, particularly, the pulse transmitter 29 and the position-information acquiring unit 27 are connected to each other by an in-vehicle communication cable 2b that is a transmission path different from an in-vehicle communication cable 2a that connects the in-vehicle communication interface 24 and the in-vehicle communication interface 25. The communication terminal device 22 divides this signal in a 1/2 frequency by the 1/2 frequency divider 30 in the position-information acquiring unit 27, and transmits a frequency-divided signal to the communication terminal device 23. Therefore, the communication terminal device 23 receives the signal of a frequency f/2(Hz). When a third communication terminal device (not shown) is further connected to the communication terminal device 23, the communication terminal device 23 divides a received signal in a 1/2 frequency by the 1/2 frequency divider 31 in the position-information acquiring unit 28, and transmits a frequency-divided signal to the third communication terminal device. Therefore, the third communication terminal device receives the signal of a frequency f/4(Hz). This method is also applied when a fourth communication terminal device (not shown) is further connected to the third communication terminal device.

In the communication terminal device 22, the signal processing unit 32 analyzes a received frequency, and determines that a signal of a frequency f(Hz) is received. In the communication terminal device 23, the signal processing unit 33 analyzes a received frequency, and determines that a signal of a frequency f/2(Hz) is received. When a third communication terminal device is connected to the communication terminal device 23, the third communication terminal device also determines that a signal of a frequency f/4(Hz) is received, in a similar manner. Because an in-vehicle position of a communication terminal device and a received frequency correspond to each other at one to one in this way, the in-vehicle position can be determined from the received frequency. Although the frequency dividing ratio is set at 1/2 in the example in FIG. 8, the frequency dividing ratio is not limited thereto, and other frequency dividing ratios can be also used.

As explained above, according to the present embodiment, each communication terminal device sequentially receives a signal transmitted from the pulse transmitter 29. A signal processing unit of each position-information acquiring unit processes a received signal, and determines a frequency of the received signal. Therefore, an in-vehicle position of a communication terminal device can be determined corresponding to a frequency of a received signal. Particularly, in a plurality of communication terminal devices that are connected by a series communication path, positions of the communication terminal devices can be firmed by using this position determination signal. As for this position information, a position number corresponding to a received frequency can be used, for example. The procedure of determining communication identification information from this position information is identical to that explained in the second embodiment.

In the present embodiment, although an example of determining a position by using a frequency of a position determination signal is explained, a position can be also similarly determined by changing a voltage or a current for each communication terminal device by using a voltage or a current in place of frequency.

Further, each communication terminal device can also determine an in-vehicle position by determining a numerical value by increasing a numerical value by one, for example, each time when a signal passes via a communication terminal device, by performing a numerical value transmission by serial communication in place of frequency transmission.

Generally, a position-determination-signal generating unit that generates a position determination signal is provided in the communication relay device 21. The communication terminal devices 22 and 23 determine in-vehicle positions based on a size (a numerical value in the serial communication such as frequency, current value, and voltage value) of a received position-determination signal. After this determination, the communication terminal devices 22 and 23 change a size of the position determination signal by a predetermined amount, and transmit this signal, respectively. It suffices that a change amount of a position determination signal that is set in each communication terminal device is an amount that differentiates a size of the position determination signal output by each communication terminal device from other size of a position determination signal, between the communication terminal devices 22 and 23. That is, sizes of position determination signals output by the communication terminal devices are different from each other.

Fourth Embodiment

Figure 9:
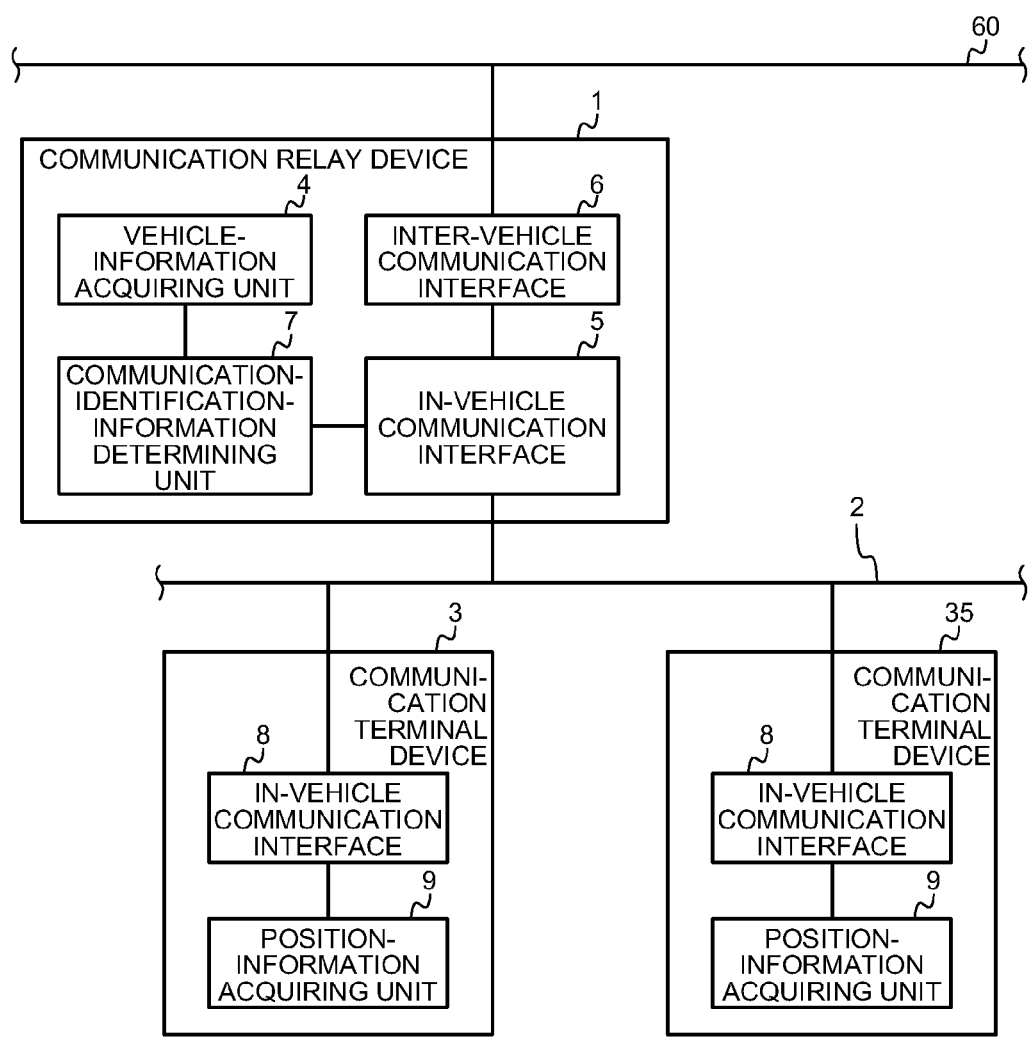
FIG. 9 is a configuration diagram of a train communication system according to a fourth embodiment.

FIG. 9 is a configuration diagram of a train communication system according to a fourth embodiment of the present invention. As shown in FIG. 9, the communication relay device 1 includes the vehicle-information acquiring unit 4, the in-vehicle communication interface 5, the inter-vehicle communication interface 6, and the communication-identification-information determining unit 7. The communication terminal device 3 includes the in-vehicle communication interface 8 and a position-information acquiring unit 9 as an in-vehicle-position determining unit. The communication terminal device 35 also similarly includes the in-vehicle communication interface 8 and the position-information acquiring unit 9. The position-information acquiring unit 9 can have a configuration identical to that explained in the second and third embodiments. The communication relay device 1 is connected to the inter-vehicle communication path 60. The communication relay device 1 and the communication terminal devices 3 and 35 are connected to each other by the in-vehicle communication path 2.

In the present embodiment, the communication-identification-information determining unit 7 that is provided in each of the communication terminal devices according to the first to third embodiments is provided in the communication relay device 1. In FIG. 9, the communication relay device 1 holds correspondence tables individually corresponding to the communication terminal devices 3 and 35 to which the communication relay device 1 is connected by the in-vehicle communication path 2. That is, the communication relay device 1 holds a plurality of correspondence tables corresponding to the number of communication terminal devices. The format of the correspondence table is identical to that shown in FIG. 7, for example. The correspondence table is set for each model without duplication, and provides communication identification information to be used corresponding to vehicle information (car number) and a position number. Other configurations of the present embodiment are identical to those explained in the first to third embodiments.

Figure 10:
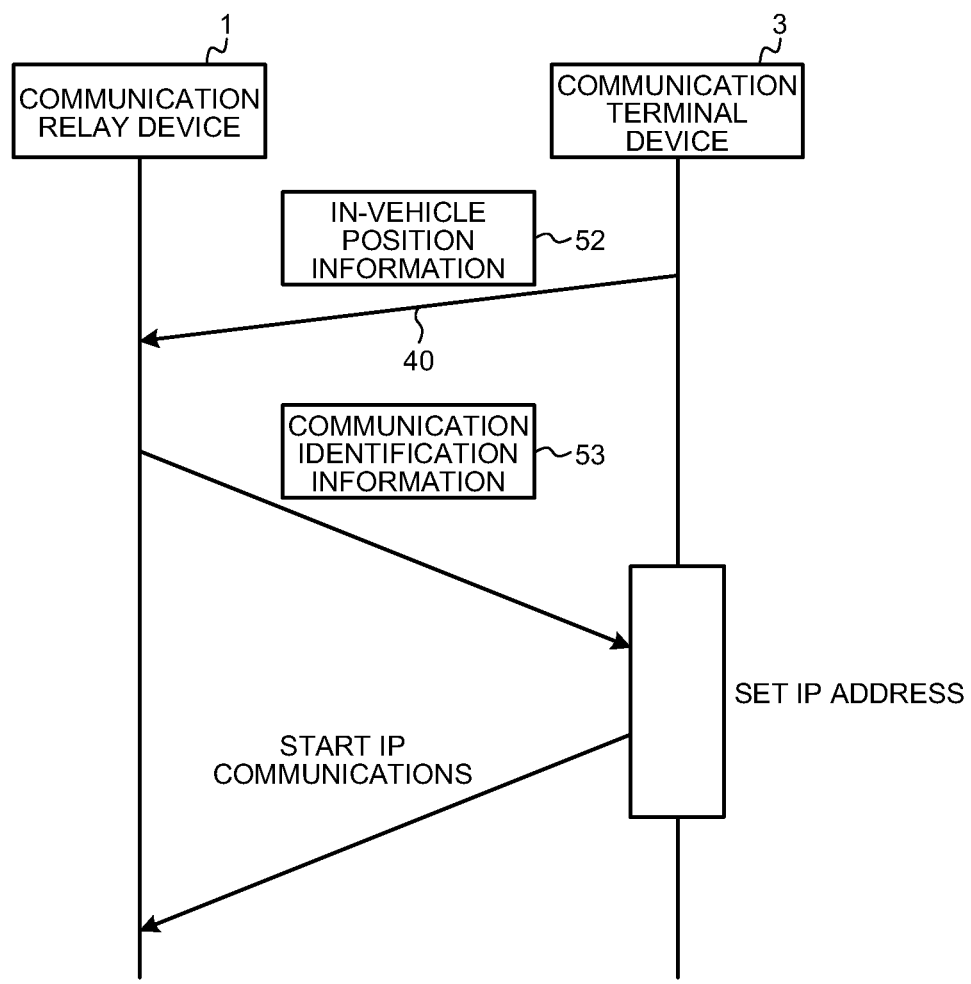
FIG. 10 depicts a sequence for a communication relay device to determine communication identification information of a communication terminal device in the train communication system according to the fourth embodiment.

FIG. 10 depicts a sequence for the communication relay device 1 to determine communication identification information of the communication terminal device 3, for example, in the present communication system. In FIG. 10, first, the communication terminal device 3 of which communication identification information is not yet determined transmits a communication-identification-information request signal 40 to the in-vehicle communication path 2. At this time, the communication terminal device 3 incorporates in-vehicle position information 52 of the communication terminal device 3 obtained by the position-information acquiring unit 9 into the communication-identification-information request signal 40, and transmits this signal.

Next, when the communication relay device 1 receives the communication-identification-information request signal 40 from the in-vehicle communication path 2, the communication relay device 1 inputs the in-vehicle position information 52 in the communication-identification-information request signal 40 to the communication-identification-information determining unit 7, and inputs vehicle information obtained from the vehicle-information acquiring unit 4 to the communication-identification-information determining unit 7.

The communication-identification-information determining unit 7 then determines communication identification information 53 to be used corresponding to the in-vehicle position information 52 and the vehicle information, by using a correspondence table corresponding to the communication terminal device 3.

Next, the communication-identification-information determining unit 7 transmits the determined communication identification information 53 to the in-vehicle communication path 2. The communication terminal device 3 then receives the communication identification information 53 from the in-vehicle communication path 2, sets the communication identification information 53, and starts communicating.

The determining process performed by the communication-identification-information determining unit 7 is identical to that performed in the communication terminal device explained in the second embodiment. Further, the position-information acquiring unit 9 explained in the second and third embodiments can be employed for the position-information acquiring unit 9 of the communication terminal devices 3 and 35. For example, when a configuration identical to that of the third embodiment is employed, a plurality of communication terminal devices are connected in series by the in-vehicle communication path 2 in the communication relay device 1. Further, a position-determination-signal generating unit is provided in the communication relay device 1.

In FIG. 9, although the communication terminal devices 3 and 35 are configured to include the position-information acquiring unit 9, respectively, the communication terminal devices 3 and 35 can be configured not to include the position-information acquiring unit 9, like the configuration in the first embodiment. In this case, a correspondence table becomes as shown in FIG. 4, for example. The determining process performed by the communication-identification-information determining unit 7 is identical to that performed in the communication terminal device explained in the first embodiment.

While effects of the present embodiment are identical to those in the first to third embodiments, in the present embodiment, the communication relay device 1 transmits communication identification information to the communication terminal device 3 in response to a request from the communication terminal device 3, for example. On the other hand, in the first and second embodiments, the communication terminal device 3 autonomously determines communication identification information.

Industrial Applicability

As described above, the train communication system according to the present invention is useful for performing communications between vehicles in a formation or within a vehicle.

Reference Signs List 1 communication relay device
2 in-vehicle communication path
3, 35, 36 communication terminal device
4 vehicle-information acquiring unit
5, 8, 10 in-vehicle communication interface
6 inter-vehicle communication interface
7, 12 communication-identification-information determining unit
9, 11 position-information acquiring unit
13 cable connector
14 contact-information acquiring unit
15 photo-coupler
16 photo-coupler power source
17 current-limiting resistor
18 protection resistor
19, 20 pin
37, 38, 39 vehicle
40 communication-identification-information request signal
50 vehicle information
52 in-vehicle position information
53 communication identification information
60 inter-vehicle communication path

The invention claimed is:

1. A train communication system that is configured in a formation of a train constituted by one or more vehicles, the system comprising:
a communication relay device that is installed in each of the vehicles of the train and is connected to an inter-vehicle communication path and an in-vehicle communication path; and
one or more communication terminal devices that are installed in each of the vehicles of the train and are connected to the communication relay device in a same vehicle by the in-vehicle communication path, wherein
the system is configured to:
determine vehicle information indicating a formation position of a vehicle within the train in which one of the communication relay devices is installed, and
determine communication identification information to be provided to the communication terminal device based on the vehicle information and a correspondence table that defines a correspondence relationship between the communication identification information and the vehicle information for each communication terminal within the train,
wherein the communication identification information is a unique IP address for each communication terminal within the train.

2. The train communication system according to claim 1, wherein
each of the communication terminal devices includes an in-vehicle position determining unit that determines an in-vehicle position of the communication terminal device within the vehicle,
the correspondence table further defines the correspondence relationship between the communication identification information, the vehicle information, and the in-vehicle position for each communication terminal within the train,
wherein the communication identification information is unique for each communication terminal within the train, and
wherein the communication identification information is determined by a communication-identification-information determining unit and is to be provided to the communication terminal device, based on the vehicle information received from the in-vehicle communication path, an in-vehicle position of the communication terminal device determined by the in-vehicle position determining unit, and the correspondence table.

3. The train communication system according to claim 2, wherein
when multiple communication terminal devices of a same model are installed the same vehicle,
a communication-identification-information determining unit in each of the communication terminal devices allocates the communication identification information corresponding to an in-vehicle position of each communication terminal device, respectively.

4. The train communication system according to claim 2, wherein the in-vehicle position determining unit determines the in-vehicle position based on contact information incorporated in either a communication connector or a power source connector of each of the communication terminal devices.

5. The train communication system according to claim 2, wherein
the communication relay device and the communication terminal devices are connected in series by the in-vehicle communication path,
the communication relay device includes a position-determination-signal generating unit that generates a position determination signal to be used for each of the communication terminal devices to determine an in-vehicle position,
the position determination signal output from the position-determination-signal generating unit is sequentially transmitted to each of the communication terminal devices, and
each of the communication terminal devices determines an in-vehicle position of the device itself based on a size of the position determination signal having received, by the in-vehicle position determining unit, changes a size of the position determination signal by a predetermined amount after a determination such that the size is different from that of a position determination signal of the other communication terminal device, and transmits the position determination signal to a next communication terminal device.

6. The train communication system according to claim 1, wherein the communication relay device includes a vehicle-information acquiring unit that acquires vehicle information indicating an in-formation position of a vehicle in which the communication relay device is installed, and a communication-identification-information determining unit that includes a correspondence table that is set without duplication for each model of each of the communication terminal devices and provides communication identification information to be used corresponding to at least the vehicle information, and determines the communication identification information to be provided to the communication terminal device, and when the communication relay device receives a communication-identification-information request signal transmitted from the communication terminal device, the communication-identification-information determining unit determines the communication identification information to be provided to the communication terminal device, based on at least the vehicle information obtained by the vehicle-information acquiring unit and the correspondence table corresponding to the communication terminal device, and transmits the communication identification information to the communication terminal device via the in-vehicle communication path.

7. The train communication system according to claim 6, wherein
each of the communication terminal devices includes an in-vehicle-position determining unit that determines an in-vehicle position of the communication terminal device,
the communication-identification-information request signal includes in-vehicle position information obtained by the in-vehicle-position determining unit,
the correspondence table provides communication identification information to be used corresponding to the vehicle information and the in-vehicle position, and
the communication-identification-information determining unit determines the communication identification information to be provided to each of the communication terminal devices, based on the vehicle information, the in-vehicle position information of the communication terminal device included in the communication-identification-information request signal, and the correspondence table.

8. The train communication system according to claim 7, wherein
when multiple communication terminal devices of a same model are installed in the same vehicle,
the communication-identification-information determining unit allocates the communication identification information corresponding to an in-vehicle position of the communication terminal device to each of the communication terminal devices.

9. The train communication system according to claim 7, wherein the in-vehicle position determining unit determines the in-vehicle position based on contact information incorporated in either a communication connector or a power source connector of each of the communication terminal devices.

10. The train communication system according to claim 7, wherein
the communication relay device and the communication terminal devices are connected in series by the in-vehicle communication path,
the communication relay device includes a position-determination-signal generating unit that generates a position determination signal to be used for each of the communication terminal devices to determine an in-vehicle position,
the position determination signal output from the position-determination-signal generating unit is sequentially transmitted to each of the communication terminal devices, and
each of the communication terminal devices determines an in-vehicle position of the device itself based on a size of the position determination signal having received, by the in-vehicle position determining unit, changes a size of the position determination signal by a predetermined amount after a determination such that the size is different from that of a position determination signal of the other communication terminal device, and transmits the position determination signal to a next communication terminal device.

11. The train communication system according to claim 1, wherein the communication identification information is an IP address.

12. A train communication method comprising:
a step of determining the following:
communication identification information to be provided to at least one communication terminal device of a plurality of communication terminal devices that are installed in each vehicle of a train constituted by one or more vehicles and that are connected to a communication relay device installed in each of the vehicles and connected to an in-vehicle communication path, in a same vehicle, based on vehicle information indicating a formation position of a vehicle within the train in which a communication relay device is installed and connected with the plurality of communication terminal devices via the in-vehicle communication path and with other vehicles via an inter-vehicle communication path, and
a correspondence table that defines a correspondence relationship between the communication identification information and the vehicle information for each communication terminal within the train,
wherein the communication identification information is a unique IP address for each communication terminal within the train.

13. The train communication method according to claim 12, wherein the method comprises:
a step of transmitting, by the communication relay device, the vehicle information to the in-vehicle communication path;
a step of receiving, by the communication terminal device, the vehicle information from the in-vehicle communication path;
a step of determining, by each communication terminal device, the communication identification information to be provided to the communication terminal device at least based on a correspondence table that is set for each communication terminal device and provides communication identification information to be used corresponding to at least the vehicle information, wherein the communication identification information is unique for each communication terminal within the train, and
a step of receiving, by the communication terminal device, the communication identification information from the in-vehicle communication path.

14. The train communication system according to claim 1, wherein the communication relay device includes a vehicle-information acquiring unit that acquires vehicle information indicating a formation position of a vehicle in which the communication relay device is installed and transmits the acquired vehicle information to the in-vehicle communication path, and
each of the communication terminal devices includes a communication-identification-information determining unit that includes a correspondence table for each of the communication terminal devices and provides communication identification information to be used corresponding to at least the vehicle information, wherein the communication identification information is unique for each communication terminal within the train, and determines the communication identification information to be provided to the communication terminal device at least based on the vehicle information received from the in-vehicle communication path and the correspondence table.

15. The train communication system according to claim 3, wherein the in-vehicle position determining unit determines the in-vehicle position based on contact information incorporated in either a communication connector or a power source connector of each of the communication terminal devices.

16. The train communication system according to claim 3, wherein
the communication relay device and the communication terminal devices are connected in series by the in-vehicle communication path,
the communication relay device includes a position-determination-signal generating unit that generates a position determination signal to be used for each of the communication terminal devices to determine an in-vehicle position,
the position determination signal output from the position-determination-signal generating unit is sequentially transmitted to each of the communication terminal devices, and
each of the communication terminal devices determines an in-vehicle position of the device itself based on a size of the position determination signal having received, by the in-vehicle position determining unit, changes a size of the position determination signal by a predetermined amount after a determination such that the size is different from that of a position determination signal of the other communication terminal device, and transmits the position determination signal to a next communication terminal device.

17. The train communication system according to claim 8, wherein the in-vehicle position determining unit determines the in-vehicle position based on contact information incorporated in either a communication connector or a power source connector of each of the communication terminal devices.

18. The train communication system according to claim 8, wherein
the communication relay device and the communication terminal devices are connected in series by the in-vehicle communication path,
the communication relay device includes a position-determination-signal generating unit that generates a position determination signal to be used for each of the communication terminal devices to determine an in-vehicle position,
the position determination signal output from the position-determination-signal generating unit is sequentially transmitted to each of the communication terminal devices, and
each of the communication terminal devices determines an in-vehicle position of the device itself based on a size of the position determination signal having received, by the in-vehicle position determining unit, changes a size of the position determination signal by a predetermined amount after a determination such that the size is different from that of a position determination signal of the other communication terminal device, and transmits the position determination signal to a next communication terminal device.

19. The train communication system according to claim 14, wherein the communication identification information is an IP address.

20. The train communication system according to claim 2, wherein the communication identification information is an IP address.

21. The train communication system according to claim 3, wherein the communication identification information is an IP address.

22. The train communication system according to claim 4, wherein the communication identification information is an IP address.

23. The train communication system according to claim 15, wherein the communication identification information is an IP address.

24. The train communication system according to claim 5, wherein the communication identification information is an IP address.

25. The train communication system according to claim 16, wherein the communication identification information is an IP address.

26. The train communication system according to claim 6, wherein the communication identification information is an IP address.

27. The train communication system according to claim 7, wherein the communication identification information is an IP address.

28. The train communication system according to claim 8, wherein the communication identification information is an IP address.

29. The train communication system according to claim 9, wherein the communication identification information is an IP address.

30. The train communication system according to claim 17, wherein the communication identification information is an IP address.

31. The train communication system according to claim 10, wherein the communication identification information is an IP address.

32. The train communication system according to claim 18, wherein the communication identification information is an IP address.

33. The train communication method according to claim 12, wherein the method comprises:
a step of transmitting to the in-vehicle communication path, by each of the communication terminal devices, a communication-identification-information request signal for requesting a transmission of communication identification information to the communication relay device;
a step of receiving, by the communication relay device, the communication-identification-information request signal from the in-vehicle communication path;
a step of determining, by the communication relay device, the communication identification information to be provided to each of the communication terminal devices, based on at least a correspondence table that is set for each model of the communication terminal device and provides communication identification information to be used corresponding to at least vehicle information, wherein the communication identification information is unique for each communication terminal within the train, and the vehicle information, by obtaining the vehicle information indicating an in-formation position of a vehicle in which the device itself is installed;
a step of transmitting, by the communication relay device, the determined communication identification information to the in-vehicle communication path; and
a step of receiving, by the communication terminal device, the communication identification information from the in-vehicle communication path.

* * * * *